United States Patent [19]
Mings

[11] Patent Number: 6,109,856
[45] Date of Patent: Aug. 29, 2000

[54] HAY BALE CARRIER

[76] Inventor: Joe D. Mings, Rt. 1, Box 115, Longdale, Okla. 73755

[21] Appl. No.: 09/086,885

[22] Filed: May 29, 1998

[51] Int. Cl.[7] .................................................... B62B 1/22
[52] U.S. Cl. ................... 414/490; 414/444; 280/47.131; 280/47.18; 280/47.17
[58] Field of Search ...................... 414/24.5, 111, 414/444, 457, 490; 280/47.18, 47.131, 47.3, 47.17, 47.24, 63, 659; 294/61, 120

[56] References Cited

U.S. PATENT DOCUMENTS

| | | | |
|---|---|---|---|
| 384,078 | 6/1888 | Roche | 280/47.24 |
| 3,985,253 | 10/1976 | Kannady et al. | 214/506 |
| 4,174,849 | 11/1979 | Wetzel | 280/47 |
| 4,193,728 | 3/1980 | Steketee | 414/111 |
| 4,490,088 | 12/1984 | Castle | 414/457 |
| 4,521,149 | 6/1985 | Redding et al. | 414/111 |
| 4,549,743 | 10/1985 | Shimon | 280/47 |
| 4,580,843 | 4/1986 | Lund | 298/18 |
| 5,501,562 | 3/1996 | Zimmerman | 414/111 |

FOREIGN PATENT DOCUMENTS

| | | | |
|---|---|---|---|
| 1149782 | 7/1983 | Canada | 414/24.5 |
| 2627945 | 9/1989 | France | 414/24.5 |
| 640699 | 1/1979 | U.S.S.R. | 414/24.5 |
| 9754 | 12/1900 | United Kingdom | 280/47.24 |

*Primary Examiner*—Douglas Hess
*Attorney, Agent, or Firm*—Robert K. Rhea

[57] ABSTRACT

A two part hay bale carrier of simplified economical construction is formed by a wheel unit and a handle member. The wheel unit comprises a pair of wheels journaled by respective ends of an axle which rigidly supports normally upright tines intermediate its ends which are inverted and manually inserted into an end corner surface of a rectangular bale. The bale and wheel unit is then righted. The handle member comprises a pair of parallel tines joined at one end in U-shaped fashion by a bight portion which projects outward of the opposite end of the bale after the hand member tines are longitudinally inserted into the bale end opposite the wheel unit enabling an operator to substantially balance the mass of the hay bale on the wheel unit and move the bale in two-wheel dolly fashion across the surface of the earth.

1 Claim, 1 Drawing Sheet

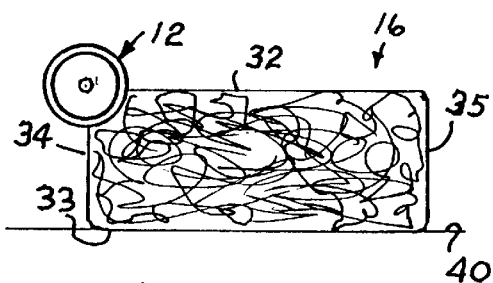
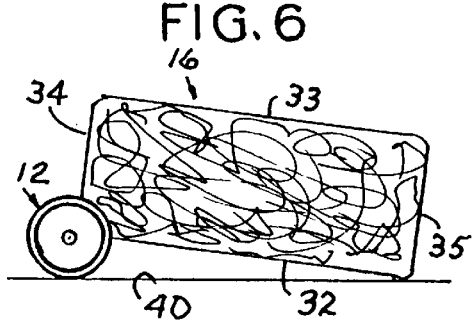
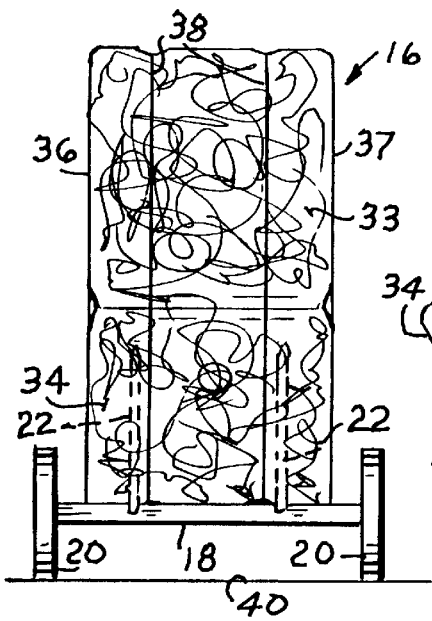
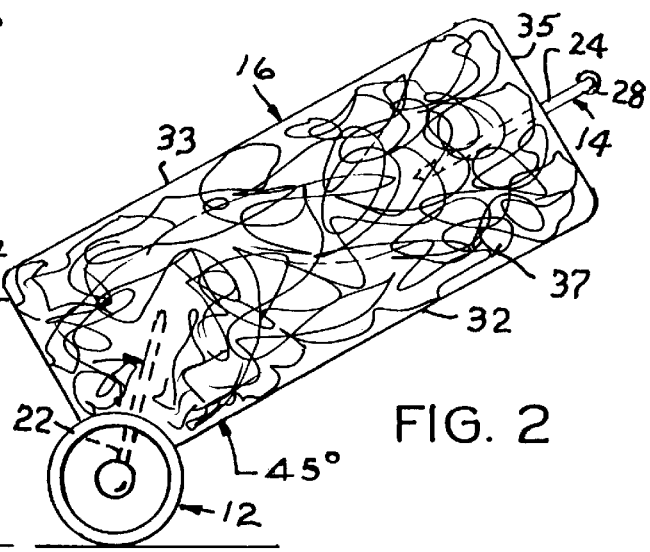
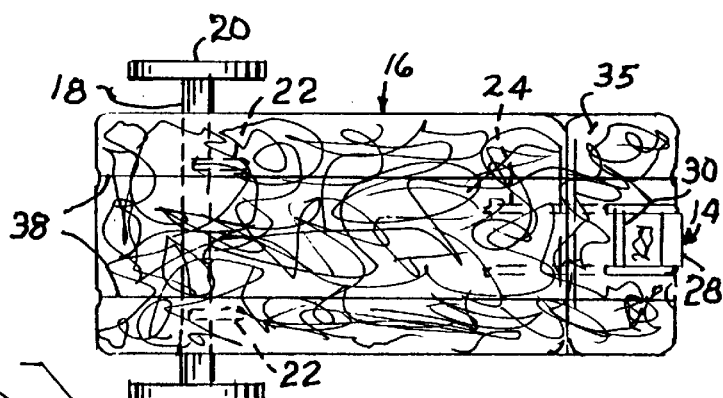
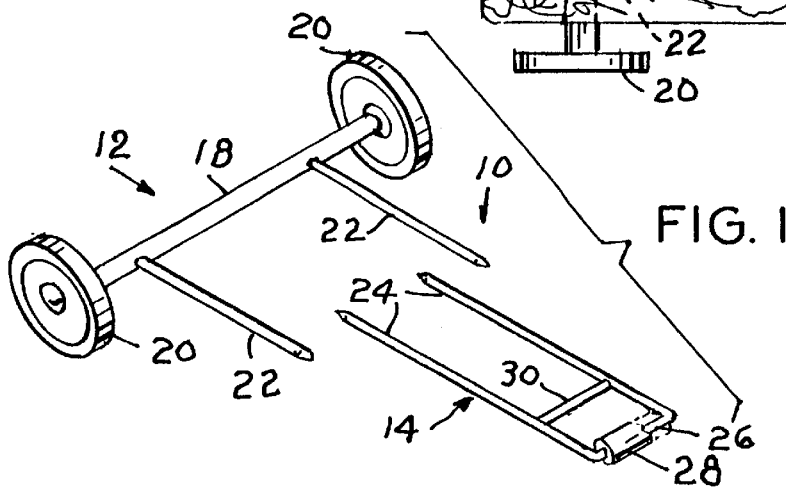

HAY BALE CARRIER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to carriers and more particularly to a carrier for hay bales of the type generally rectangular in configuration, bound by two strands and weighing less than 45 kg (100 lb).

1. Field of the Invention

Horses and other prize livestock used or shown at fairs are frequently stationed inconvenient distances from the source of hay utilized as food for the animals. The owners or attendants of the livestock must transport hay bales from a source, usually remote from the location of the animal's stall, for food or bedding. Many persons thus caring for such livestock are of small stature, and a bale of hay of such mass requires additional help which is sometimes unavailable.

2. Description of the Prior Art

Devices for such purposes as known in the prior art are generally bulky and in overall configuration are not easily, stored in a livestock trailer preferably containing the feed, including bales of hay, which the owner of the livestock transports with the animal in order to minimize expenses of attending a fair.

U.S. Pat. No. 4,174,849 issued Nov. 20, 1979 to Wetzel for Wheelbarrow Type Carrier discloses an elongated framework extending longitudinally beyond the respective ends of a hay bale. A wheel is provided at one end of the frame, and handles at its other end. Rearwardly projecting prongs at the forward end engage one end of the hay bale and pivoting prongs at the handle end portion grip the other end portion of the hay bale to be lifted in wheelbarrow fashion and moved along the surface of the earth.

U.S. Pat. No. 4,549,743 issued Oct. 29, 1985 to Shimon for Hay Bale Carrier discloses an axle having wheels at either end thereof and an open rod like frame which, when inverted on the top of a hay bale may be connected with the strands thereof, and then the carrier and bale inverted for moving the hay bale across the surface of the earth by an attendant balancing the bale on the wheels.

U.S. Pat. No. 3,985,253 issued Oct. 12, 1976 to Kannady, et al., for Large Hay Bale Carrier, and U.S. Pat. No. 4,580,843 issued Apr. 8, 1986 to Lund for Bale Rack, represent the further state-of-the-art, particularly of bulky bale carriers for moving a single large cylindrical hay bale or multiple rolls of hay bales, respectively.

This invention is distinctive over the above named patents by providing a two-piece kit including a pair of wheels mounted on an axle with a pair of prongs projecting laterally from the axle in orthogonal relation for entering the forward end portion of a hay bale, and a handle member inserted in the opposite end of the bale permitting an operator to move the bale in two-wheel dolly fashion across the surface of the earth.

BRIEF SUMMARY OF THE INVENTION

An axle having a length greater than the width of a bale to be moved is axially connected with a wheel at its respective ends and provided, intermediate its ends, with a pair of tines rigidly projecting in parallel orthogonal relation laterally of the axle for longitudinal insertion into one end portion of a hay bale to be moved. A handle member comprising a U-shaped rod member of selected length is manually inserted longitudinally into the opposite end portion of the hay bale permitting an operator to lift one end of the hay bale by the handle for moving the bale by pushing the latter in a forward direction with the mass of the bale principally supported by the wheels and axle.

The principal object of this invention is to provide a two-part simple economical carrier for transporting rectangular bales of hay from one location to another in two-wheel dolly fashion; which substantially eliminates lifting the bale of hay in attaching it to the carrier in order to transport the bale from one location to another; and, is easily connected with a hay bale to be moved by simply inserting tines in a bale penetrating action into respective end portions of a bale of hay.

BRIEF DESCRIPTION OF THE SEVERAL VIEWS OF THE DRAWINGS

FIG. 1 is a perspective view of the device;

FIG. 2 is a side elevational view of the device operatively connected with a bale of hay;

FIG. 3 is a front elevational view of FIG. 2;

FIG. 4 is a top view of FIG. 2;

FIG. 5 diagrammatically illustrates the manner of connecting the wheel unit with a hay bale; and, FIG. 6 illustrates the position of the bale and wheel unit prior to inserting the handle member in the opposite end of the hay bale.

DETAILED DESCRIPTION OF THE INVENTION

Like characters of reference designate like parts in those figures of the drawings in which they occur.

In the drawings:

The reference numeral 10 indicates the bale carrier device comprising a wheel unit 12 and a handle unit 14 which, when connected with a hay bale 16 as presently described, permits the major mass of the hay bale to be supported by the wheel unit and moved across the surface of the earth in two-wheel dolly fashion by the operator grasping the handle unit 14.

The wheel unit 12 comprises an axle 18 of selected diameter, having a length greater than the transverse width of the bale 16, journaling a pair of wheels 20 at its respective ends. The diameter of the wheels is a matter of choice, for example, 20.22 cm (8 in.) for ease in moving the hay bale across imperfections on the surface of the earth, such as small rocks or rough ground. A pair of parallel tines 22 are rigidly connected by one end portion to the axle 18 intermediate its ends and project laterally therefrom in cooperative orthogonal relation with respect to the axle. When the wheel unit 12 is in use (FIG. 2) the tines 22 are substantially disposed upright. The length of the tines is also a matter of selection, preferably sufficiently long to remain embedded in the bale 16 as presently described, for example, a length of approximately 30.48 cm (1 ft.) or more.

Handle member 14 is U-shaped, formed by a pair of parallel tines 24 of similarly selected length joined at one end by a bight portion 26 surrounded by a cylindrical hand grip member 28 freely rotatably surrounding the bight portion 26. The tines 24 are joined by a cross brace 30 adjacent the hand grip 28 for rigidity.

Referring also to FIGS. 5 and 6, the rectangular hay bale 16, is defined by generally parallel flat surfaces 32 and 33, end surfaces 34 and 35, and lateral side surfaces 36 and 37. The material of the bale is maintained compacted in its generally rectangular shape by a pair of endless strands 38 extending longitudinally of the flat surfaces 32, 33 and end surfaces 34, 35.

The wheel carrier unit 12 is connected with the hay bale 16 by positioning the axle transversely of an end portion of the bale and manually forcing the tines 22, in a bale penetrating action, into a corner portion of the bale, such as defined by the juncture of the flat surfaces 32 and 34 with the axes of the tines generally disposed at a 45° angle with respect to the planes defined by the surfaces 32 and 34. With the axle thus positioned adjacent the bale corner, the bale is manually turned in a side wise rolling action, with the wheel unit 12 attached, in either lateral direction, to dispose the wheels downwardly as illustrated by FIG. 6. The tines 24 of the handle unit 14 is then similarly inserted longitudinally into the opposite end 35 of the bale by manually forcing the tines 24 into the bale substantially central of the bale end plane surface 35.

OPERATION

With the carrier 10 connected with a bale 16 as described hereabove, the bale may be moved by the operator lifting the handle connected end portion of the bale in an upward direction to dispose the majority of the mass of the bale on the axle and wheels. By pushing on the handle member 14, the bale and its connected carrier may be moved across the surface of the earth indicated by the line 40.

Obviously the invention is susceptible to changes or alterations without defeating its practicability. Therefore, I do not wish to be confined to the preferred embodiment shown in the drawing and described herein.

What is claimed is:

1. A carrier for transporting a bale of tine penetratable compacted vegetation, said bale having opposing ends and having a plurality of orthogonally disposed surface areas defining transverse bale corner surfaces at respective ends of the bale, the carrier device comprised of a wheel and axle means in combination with a handle means for supporting the mass of said bale during movement of said bale, said wheel and axle means comprising:

an axle transversely underlying—one end of—said bale and projecting at respective end portions beyond the respective corner surface of said—one end of—bale; a wheel journaled by the respective end portion of said axle; tines rigidly extending upwardly from an intermediate portion of said axle in angular relation with respect to the planes of the bale surface areas defining said one corner surface;

handle means, mechanically unconnected to said wheel and axle means, for piercing the end of said bale opposite the wheel and axle means for pivoting said bale about the axis of said axle and applying a force to move the bale across the surface of the earth, the handle means comprising:
a U-shaped member having a bight portion and parallel leg tines for penetratably entering the end face surface of the bale opposite the wheel and axle means; and,
a cross brace rigidly joining—the end portions of—said leg tines adjacent—but spaced from—the bight portion for limiting bale penetration of the leg tines.

* * * * *